Jan. 27, 1959     D. R. HULL ET AL     2,870,788
FLOW CONTROL APPARATUS FOR WATER TREATMENT SYSTEMS
Filed Dec. 6, 1952     4 Sheets-Sheet 4

Inventors
Dean R. Hull and
Robert A. Whitlock, Jr.
By McCanna and Morsbach
Attorneys

United States Patent Office 2,870,788
Patented Jan. 27, 1959

2,870,788

FLOW CONTROL APPARATUS FOR WATER TREATMENT SYSTEMS

Dean R. Hull and Robert A. Whitlock, Jr., Rockford, Ill., assignors to Aquamatic Inc., a corporation of Illinois Application December 6, 1952, Serial No. 324,584

20 Claims. (Cl. 137—613)

This invention relates to fluid control apparatus of the type used in water treatment systems, and to flow control valves of the type primarily adapted for use therein.

An object of this invention is to provide a novel fluid flow control apparatus which includes a valve having a fluid pressure operated mechanism for turning the distributor for establishing different flows therethrough and an auxiliary valve controlling the operation of said mechanism for turning the distributor of the valve which insures proper turning of the distributor in the desired manner.

Another object of this invention is to provide novel fluid control device for water treatment apparatus which includes a control valve having a distributor adapted to be turned between different rotative settings for providing different flows through the valve wherein the flow to service is terminated while the distributor of the valve is being turned.

A further object of this invention is to provide a valve having a novel and improved arrangement for turning the distributor of the valve in response to fluid pressure.

It is also an object of this invention to provide a high capacity multiple flow valve of novel construction providing for maximum flows through the valve while avoiding an unduly large size of the valve.

Another object of this invention is to provide a novel multiple flow valve in which there is provided a fluid pressure operated arrangement for turning the distributor which is sealed from the various flows through the valve.

Another object of this invention is to provide a valve of the type having a distributor for controlling flow through the valve mounted on a reciprocatory and rotatable stem, wherein there is provided a novel bearing arrangement for the stem at spaced locations on opposite sides of the distributor.

Another object of this invention is to provide a lift turn valve of novel construction which avoids the occurrence of water hammer upon unseating and reseating of the distributor of the valve.

A further object of this invention is to provide a valve having a distributor adapted to be turned between different rotative positions for establishing different flows through the valve and a novel arrangement for indicating the position of the distributor.

A still further object of this invention is to provide a valve of novel construction which includes a body having a face, a distributor in confronting relation with the face of the body for establishing different flows therethrough in different rotative settings of the distributor and passages in the face of the body positioned to be covered by the distributor at certain of its rotative settings and to be located beyond the periphery of the distributor at other rotative settings.

Other and further objects and advantages of this invention will be apparent from the following description of one embodiment thereof, which is shown in the accompanying drawings to illustrate the principles and operation of the present invention.

Figures 1, 2, 3, 4:
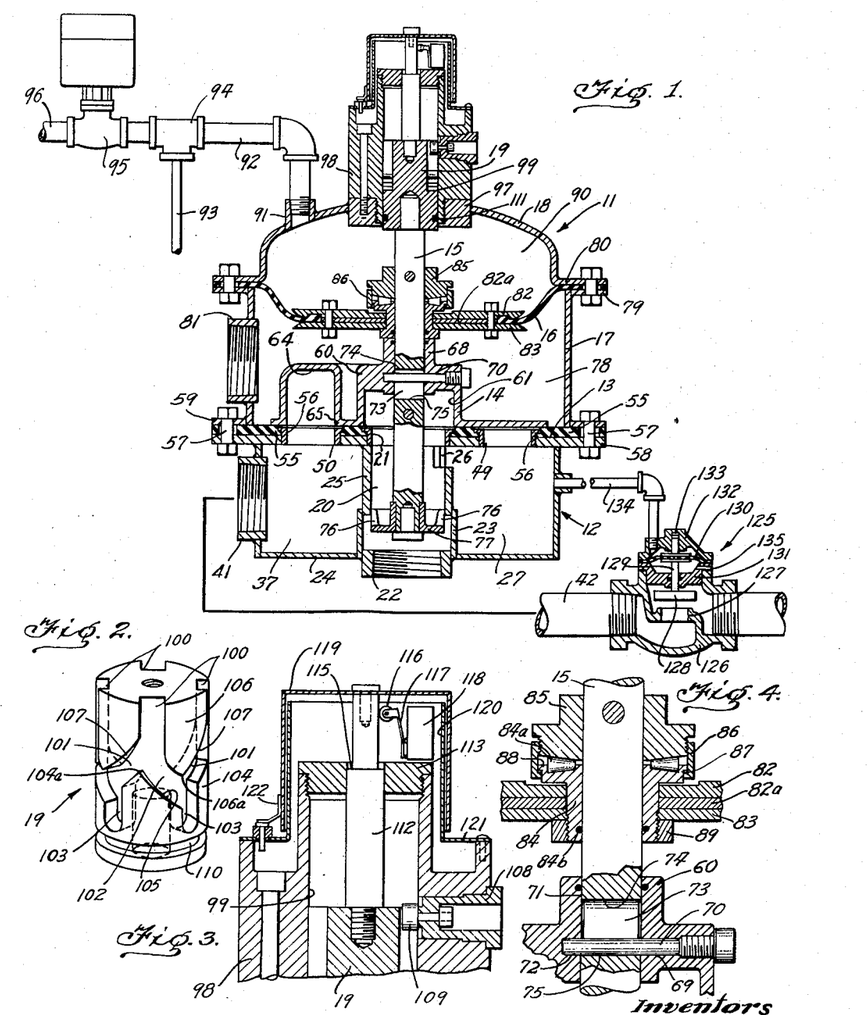
Figure 1 shows the fluid control apparatus of the present invention, with the control valve and an auxiliary valve in the service line shown in section.
Figure 2 is a perspective view of the cam for turning the distributor of the control valve in response to movement of the valve stem.
Figure 3 is an enlarged fragmentary view in section showing details of the upper end of the control valve.
Figure 4 is a fragmentary sectional view showing in enlarged detail the lost-motion connection between the distributor and the stem of the control valve and the connection of the stem to the diaphragm in this valve.

Referring to the drawings, the fluid control apparatus of the present invention includes a control valve in the form of a multiple port valve indicated generally at 11 in Fig. 1. In general this valve comprises a body 12 having an inner face 13, a distributor 14 adapted to be seated in confronting relation with the face of the body and to be unseated, turned, and reseated at the face of the body, a valve stem 15 for unseating, turning, and reseating the distributor, a flexible diaphragm 16 for moving the valve stem axially, clamped between the upper end of an annular intermediate housing member 17 and the lower end of a top cover 18 and a cam 19 carried on the upper end of the valve stem for turning the valve stem and the distributor in response to axial movement of the stem.

Figure 5:
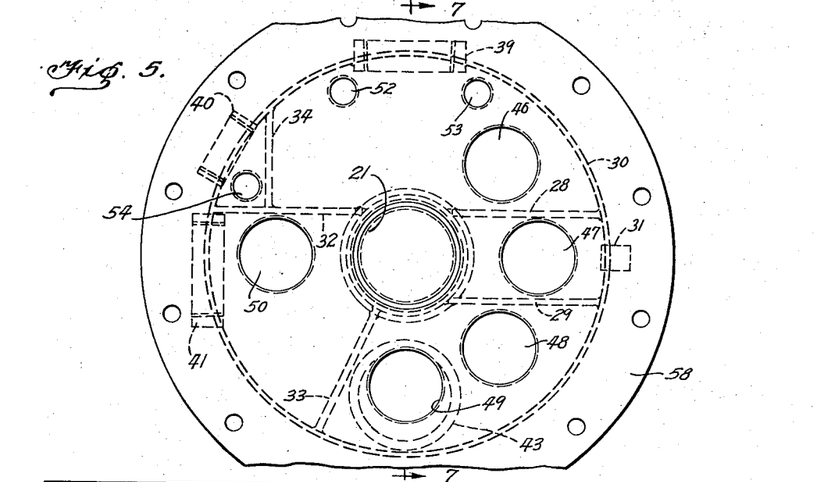
Figure 5 is a plan view of the body of the control valve, showing the inner face of the body for cooperation with the distributor.
Figure 6:
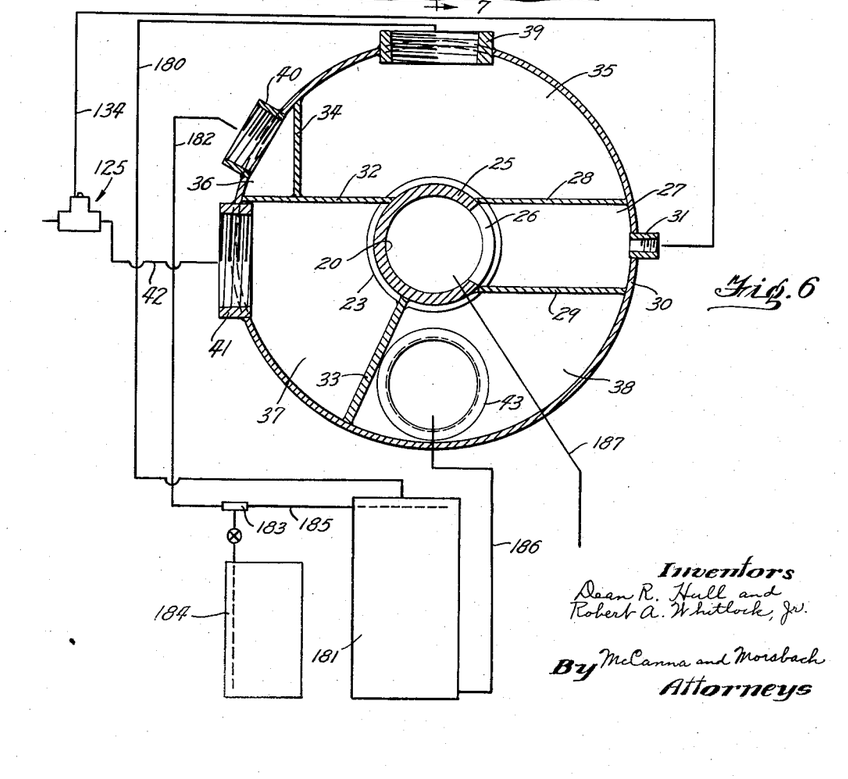
Figure 6 is a diagrammatic view of a water treatment system showing a section through the body parallel to and below the inner face of the body.
Figure 7:
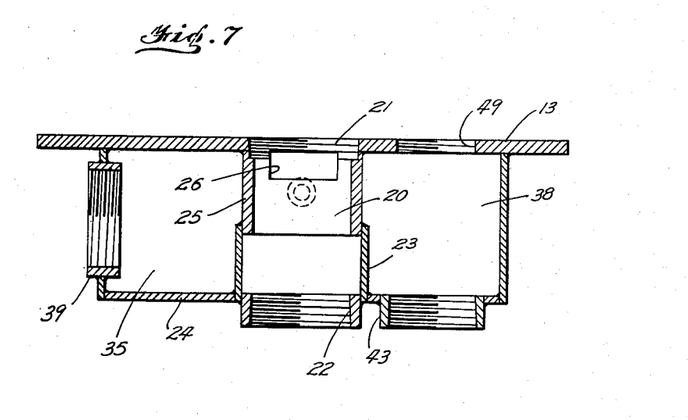
Figure 7 is a section on the line 7—7 of Fig. 5.

The body 12 (Figs. 5–7) below its face 13 is divided into a plurality of separate fluid chambers for passing fluid in the various flows to a water treatment apparatus during the service run and during the various steps in the regeneration of the apparatus. At the center of the body there is provided a downwardly extending drain passage 20 communicating at its upper end with the centrally located drain passage 21 in the body face 13 and its lower end with a drain outlet fitting 22 connected to a pipe 187 (Fig. 6). The drain passage in the body is defined by a lower annular member 23 extending vertically upwardly from the lower outer wall 24 of the body and another annular member 25 secured to the upper end of the annular member 23 and extending up to the underside of the inner face 13 of the body at the drain passage 21 therein.

Adjacent its upper end the upper annular member 25 at the central drain passage 20 is formed with a rectangular opening 26 (Fig. 7) leading to a passage 27 in the body defined by upstanding partitions 28 and 29 in the body (Fig. 6). The partitions 28 and 29 extend from top to bottom between the underside of the inner face 13 and the bottom wall 24 of the body and from the central drain body. A fitting 31 for connection to a pipe is mounted in the outer side wall 30 of the body in communication with the passage 27.

Partitions 32 and 33 also extend outward from the annular members defining the central drain passage 20 to the outer side wall 30 from top to bottom between the ported inner face 13 and the outer bottom wall 24 of the body. A short partition 34 extends transversely from the partition 32 to the outer side wall 30 of the body. These partitions divide the body into separate chambers 35, 36, 37 and 38, as well as the aforementioned passage 27. In the outer side wall 30 there is provided a fitting 39 for connection to a conduit 180 (Fig. 6) leading to the top of a water treatment tank 181 and communicating with the chamber 35 in the body. A fitting 40 in the outer side wall 30 of the body leads from the chamber 36 therein to a conduit 182 to the inlet of an externally located ejector 183 for passing reagent from a reagent tank 184 through conduit 185 to a distributor at the top of treatment tank 181 in the conventional manner. A fitting 41 in the outer side wall of the body leads from the chamber 37 therein to a service conduit 42 (Fig. 1) for passing treated water from the treatment tank to its ultimate point of use. A fitting 43 mounted in the bottom wall 24 of the back plate communicates with the body chamber 38 and is connected to a conduit 186 leading to the bottom of the water treatment tank below the bed of water treatment material therein.

At its inner face 13 (Fig. 5) the body is provided with a plurality of circumferentially arranged passages spaced about the central drain passage 21. These passages include the passage 46 leading into the body chamber 35, the passage 47 communicating with the passage 27 in the body, the passage 48 and 49 communicating with the body chamber 38, and the passage 50 communicating with the body chamber 37. In addition, there are provided a series of smaller passages in the inner face of the body arranged equidistantly from the central drain passage 21, consisting of the passages 52 and 53 in communication with the chamber 35 and the passage 54 communicating with the body chamber 36.

As best seen in Fig. 1, there is provided a gasket member 55 overlying the inner face of the body and formed with openings registering with the aforementioned passages in the inner face 13 of the body. Annular flanged ferrules 56 are provided at each of the registering passages in the gasket member 55 and the inner face 13 of the body. The gasket member 55 is tightly clamped by bolts 57 between the peripheral flange 58 at the top of the body 12, at the inner face 13 thereof, and a peripheral flange 59 at the lower end of the intermediate housing member 17.

The distributor 14 is generally in the form of a flat plate having a flat, lower face adapted to be seated against the upper face of the gasket member 55 with the passages in the distributor registering with certain of the passages in the inner face of the body for establishing the various flows through the control valve in different rotative positions of the distributor. The distributor (Figs. 9 and 10) is provided at its center with an upstanding boss 60 defining a passage 61 leading down into the drain passage 20 in the body. At the upper side of the rotor there is provided a passage 62 leading radially outward from the central passage 61 to a passage 63 at the bottom face of the distributor located to register selectively with certain of the body passages 46–50 in the various rotative positions of the distributor.

Also at its upper side the distirbutor is formed with a transfer passage 64 extending between passages 65 and 66 at the under face of the distributor located to register selectively with preselected ones of the passages 46–50 in the inner face of the body. A supply passage 67 extending down through the distributor 14 is likewise located to register with preselected ones of the body passages 46–50 in the various positions of the distributor.

Figure 9:
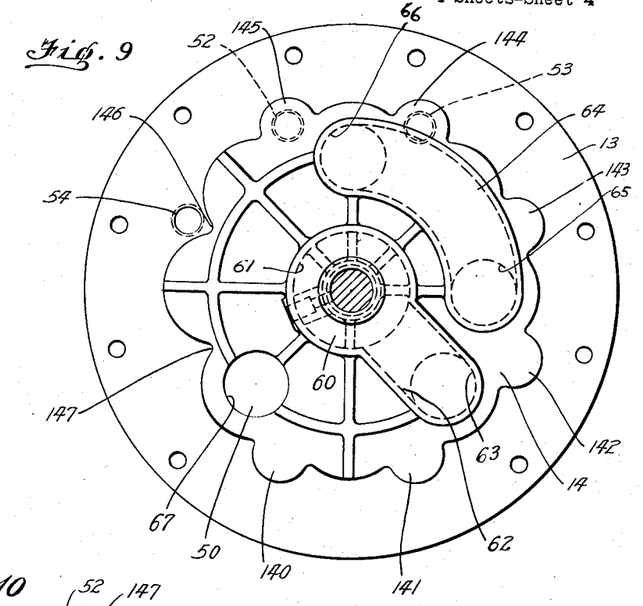
Figure 9 is a plan view showing the distributor overlying the face of the body in the regenerant injection setting of the control valve.
Figure 10:
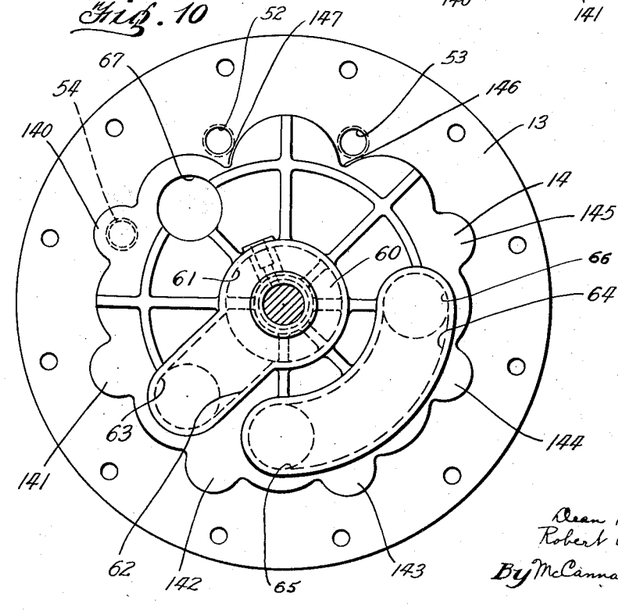
Figure 10 is a view similar to Fig. 9, showing the rinse setting of the control valve.

As best seen in Figs. 9 and 10, the distributor 14 does not extend completely across the face 13 of the body. The periphery of the distributor is of irregular configuration, with portions of the distributor being located at unequal distances from the axis of rotation thereof. Thus, the distributor at its periphery has a plurality of evenly spaced, outwardly protruding, solid segments 140–145 located to overlie the passages 52, 53 and 54 in the inner face of the body at certain of the rotative settings of the distributor for opening these passages to communicate with the supply chamber above the distributor, as described in detail hereinafter.

At the central boss 60 (Fig. 4) the distributor also carries a tubular collar 68 for passing the stem 15 of the control valve. A transverse hole 69 extends through one side of the central boss 60 and receives a pin 70 which extends across the axial passage 71 through the collar 68 into a hole 72 at the opposite side of the boss 60. As best seen in Figs. 1 and 4 the stem 15 is formed with a slot 73 at which the pin 70 is located and which presents a spaced pair of transverse shoulders 74 and 75 adapted to engage the pin 70 for moving the distributor axially in unison with the stem after initial lost-motion movement of stem 15. Thus, as shown in Fig. 1, when the distributor 14 is seated and the stem 15 is in its retracted, lowered position, the lower shoulder 75 on the stem is spaced below the pin 70 and the stem 15 is capable of substantial upward movement before its lower shoulder 75 engages the pin 70 attached to the distributor to lift the same upwardly upon continued upward movement of the stem.

Referring again to Fig. 1, at the drain passage member 25 in the body there is provided a flanged annular drain valve member 77 carried on the lower end of the stem 15 in the drain passage 20. The drain valve member 77 carries four evenly spaced, upwardly projecting guide fingers 76 slidably received within the upper drain passage member 25 and is dimensioned to be snugly received in the passage, so that when the valve stem 15 is raised the drain valve member 77 closes the drain passage 20 at the member 25. The annular sleeve member 23 is substantially larger in internal diameter than the member 25 to provide suitable flow around the valves 77 in the open position shown in Fig. 1. When the stem 15 is lifted upwardly the annular drain valve member 77 moves into the upper drain passage member 25 to close the drain passage 20 before the distributor 14 is unseated by its described lost-motion connection to stem 15. As the stem 15 continues its upward movement to unseat rotor 14 the valve member 77 carried at the lower end of the stem slides up along the inside of the member 25 at the drain passage 20 in the body, so that this drain passage is maintained closed while the distributor is unseated.

As best seen in Fig. 1, the distributor is located in a fluid supply chamber 78 enclosed by the intermediate housing member 17, the gasket 55 overlying the ported inner face 13 of the body, and the assembly at the flexible diaphragm 16 which is clamped between an upper transverse peripheral flange 79 on the intermediate housing member and a lower transverse peripheral flange 80 on the top cover 18. A fitting 81 in the intermediate housing member 17 provides an untreated fluid inlet into the fluid supply chamber 78 to supply untreated fluid to the control valve and to apply fluid pressure against the distributor 14 for maintaining it seated. The diaphragm 16 at the top of the fluid supply chamber 78 is preferably of flexible, resilient, fluid-tight material, such as rubberized fabric. Centrally located annular plates 82 and 83 clamp the diaphragm between them in a fluid-tight manner and extend across the central portion of the fluid supply chamber 78. A spacer plate 82a is located between the clamping plates 82 and 83. As shown in Figs. 1 and 4, the plates 82, 82a and 83 are centrally apertured to receive the annular member 84 through which the stem 15 extends rotatably. An attachment member 85 fastened to the stem 15 above the fluid supply chamber 78 is externally threaded at its lower end and threadedly engages a nut 86 thereat. The nut 86 has an inwardly extending transverse flange 87 underlying an outwardly protruding annular flange 88 on the upper end of the member 84. Roller bearings 84 are located between the upper end of member 84 and the lower end of attachment member 85. At its lower end the member 84 is externally threaded and receives a nut 89 threadedly thereat. An O-ring 84b is located between the stem 15 and the annular member 84 through which it extends. The stem 15 and the attachment member 85 are mounted to turn as a unit with respect to the diaphragm clamping assembly of the plates 82 and 83, the member 84a and the nut 89. In addition, the valve stem 15, its attachment member 85, and the diaphragm clamping assembly move axially up and down in unison with the diaphragm. This arrangement provides a fluid-tight seal through which the valve stem 15 extends upwardly beyond the fluid supply chamber 78.

The top cover 18 is generally dome-shaped in configuration and extends above the diaphragm to define therewith a pressure chamber 90 at which fluid pressure may be applied against the top of the diaphragm. At a fitting 91 at the top cover there is connected a fluid supply conduit 92. A small inlet pipe 93 leads into the conduit 92 at a T-fitting 94 and is arranged in open communication with the conduit 92. Beyond this T-fitting there is provided a pilot valve 95 which controls communication between the pressure supply conduits 92 and 93 and a large drain pipe 96. The pilot valve 95 is normally closed and enables water from the small inlet pipe 93 to flow through conduit 92 into the pressure chamber 90 above the diaphragm to apply rotor-seating pressure against the diaphragm. The pilot valve 95 is controlled by a switch to open at a predetermined time for rapidly emptying to drain through the large drain pipe 96 the fluid in the pressure chamber 90 and the fluid supply from the inlet pipe 93. The re-closing of this pilot valve is under the control of a switch which is actuated in response to the raising of the valve stem 15 as the distributor is unseated, as described in detail hereinafter.

At the center of the dome-shaped top cover 18 there is secured an annular collar 97 fixed to the top cover 18 in a fluid-tight manner, as by welding. A cam guide 98 is secured to the collar 97 and defines a cylindrical guide passage 99 for receiving a cam 19 attached to the upper end of the valve stem 15. As best seen in Fig. 2, the cam 19 is generally cylindrical in configuration and has a continuous cam groove in its periphery. This cam groove includes four evenly spaced vertical groove portions 100 at the upper half of the cam, relatively short groove segments 101 extending up angularly into the lower ends of the groove portions 100, longer groove portions 102 leading down angularly in the opposite direction from the bottom of the vertical upper groove portions 100, and vertical downwardly extending groove segments 103 located below and in communication with the lower ends of adjacent groove portions 101 and 102. With this configuration of the cam groove there are provided four symmetrically arranged, solid guide segments 104 on the lower half of the cam which have non-symmetrical generally V-shaped upper faces, with the point 104a, of the V located in alignment with the side wall of the vertical upper groove 100 which is adjacent the upwardly extending short cam groove segment 101. Thus, the solid segments 104 at the lower half of cam 19 present elongated helical faces 105 which are disposed directly beneath the top vertical cam groove portions 100 and which incline downward to the right in Fig. 2. The solid segments 106 at the upper half of the cam are of similar configuration and present lower points 106a located in alignment with the left side wall of the adjacent lower vertical groove portion 103 in Fig. 2 and elongated helical faces 107 disposed directly above the lower vertical cam groove portions 103 and which incline upward to the right in Fig. 2. As best seen in Fig. 3 a bearing retainer 108 projects transversely through the cam guide 98 and supports a cam follower 109, which projects into the guide passage 99 for the cam and is received in the cam groove.

In the operation of this cam arrangement, when the distributor 14 is seated and the valve stem 15 is in its lowered position, the cam 19 is in its lowermost position and the cam follower 109 is located in one of the upper vertical portions 100 of the cam groove. As the valve stem 15 is lifted to unseat the distributor the cam 19 moves upward with the valve stem and moves the corresponding inclined face 105 up into engagement with the stationary cam follower 109. Upon continued upward movement of the cam, its inclined face 105 rides over the cam follower, which causes the cam 19 and the valve stem 15 to turn as a unit during their upward movement. When the valve stem 15 has been fully raised the cam follower 109 is located in the adjacent lower vertical groove portion 103 of the cam groove, and the stem has been turned one-eighth of a turn from its previous position. When the valve stem is again lowered it moves the adjacent upwardly inclined cam face 107 down into engagement with cam follower 109, and continuing downward movement of the cam causes this inclined face 107 to ride over the cam follower for turning the cam and the valve stem an additional one-eighth of a turn. In like manner, with each up and down movement of the valve stem, the cam and cam follower causes the valve stem 15 and the distributor 14 to be turned one-quarter of a turn, or ninety degrees angularly about the axis of the distributor.

Near its lower end the cam 19 has a peripheral groove 110 in which is located an O-ring 111 which snugly engages the internal cylindrical wall of the cam guide 98 at the passage 99 therethrough. In this manner the cam is effectively sealed in a fluid-tight manner from the pressure chamber 90. Preferably the cam is packed in grease for lubrication purposes.

Attached to the upper end of cam 19 and extending upward therefrom is a switch-actuating stem 112. The switch stem extends up through an annular collar 113 threaded onto the upper end of the cam guide member 98. Toward its upper end the stem 112 is reduced in diameter and presents an upwardly facing, transverse shoulder 115 adapted to engage a roller 116 mounted on the actuator 117 of a precision snap-acting switch 118 when the valve stem is raised. The switch 118 is arranged to control the pilot valve 95 to re-close this valve only after valve stem 15 has been raised and turned one-eighth of a turn, as described, and the distributor has been fully unseated. Thus, the shoulder 115 on valve stem 112 attached to cam 19 engages the actuator of switch 118 to close this switch only after the valve stem 15 has been properly positioned to complete the turning of the distributor to its next rotative setting upon movement of stem 15 for reseating the distributor.

Figure 8:
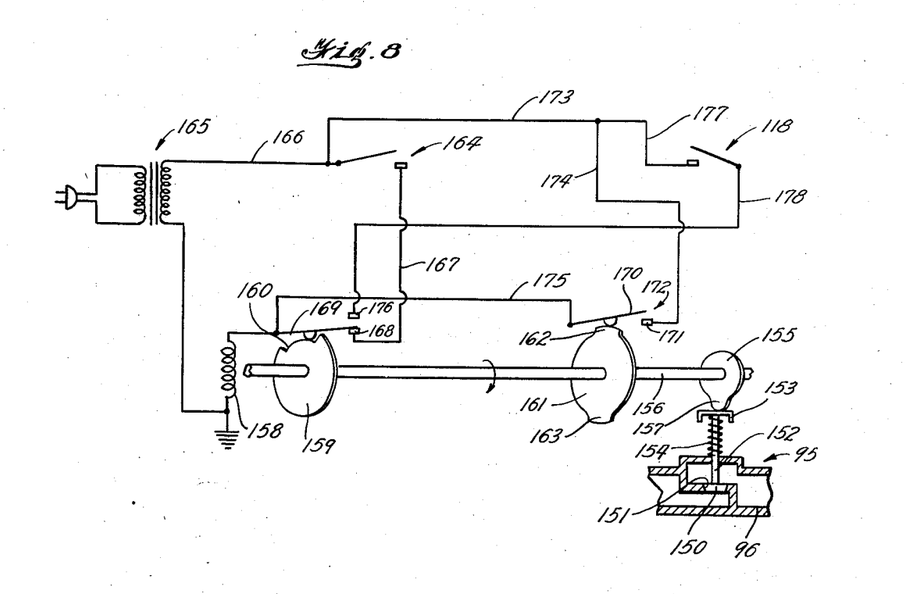
Figure 8 is a schematic circuit diagram showing suitable actuating mechanism for the pilot valve in the control apparatus of the present invention.

The control circuit for pilot valve 95 is shown schematically in Fig. 8. As shown in this figure, the schematically illustrated valve 95 includes a valve element 150 adapted to seat at the valve seat 151 to block flow through the service conduit 96. Valve element 150 is attached to a reciprocatory stem 152 which carries a cam follower 153 on its upper end. A compression coil spring 154 acts against the follower 153 to bias the valve element 150 to its open position. A cam 155 carried on a shaft 156 is positioned to engage the follower 153 for controlling the position of valve element 150. As shown in Fig. 8, when the raised cam face 157 on the cam engages the follower 153 it maintains valve element 150 in its closed position, against the bias of spring 154. When the raised portion 157 on the cam moves away from engagement with cup-shaped member 153, the spring 154 is free to move valve element 150 to its open position.

The shaft 156 which controls the position of the cam 155 is driven when the field coil 158 of the driving motor for shaft 156 is energized. Shaft 156 also carries a cam 159 having a valley 160 and a cam 161 having diametrically opposed, raised faces 162 and 163.

The energization of motor field coil 158 for opening and closing the auxiliary valve 95 is under the control of a switch 164 for initiating the regeneration of the treatment apparatus and the switch 118 which is actuated in response to the position of the stem of the multiport valve, as described. Switch 164 may be under the control of a conventional time clock, or under the manual control of the operator of the treatment apparatus, or by any other suitable arrangement.

In the operation of this control circuit for the auxiliary valve, with the ports initially in the position shown in Fig. 8, when switch 164 is closed an energization circuit for motor field coil 158 is completed from one side of the secondary step-down transformer 165 through line 166, closed switch 164, line 167, fixed contact 168, movable switch blade 169 (controlled by cam 159), through the motor field coil 158 to the grounded other side of the transformer secondary. This energization of the motor field coil causes cam shaft 156 to turn in the direction indicated by the arrow in Fig. 8. As the cam shaft turns the face 157 on cam 155 turns away from engagement with the follower 153 and permits auxiliary valve 95 to open.

After a predetermined rotation of shaft 156, the face 162 on cam 161 will have moved away from the cam follower carried by movable switch blade 170, permitting this switch blade to lower into engagement with the fixed contact 171 of switch 172. Closing of switch 172 completes an energization circuit for the motor field coil through lines 166, 173, 174, closed switch 172 and line 175 to maintain the motor field coil energized independent of the position of switch blade 169.

With the pilot valve 95 having been opened, cam shaft 156 makes a half turn in a few seconds time. During this turning of the shaft the valley 160 on cam 159 moves away from engagement with the cam follower for switch blade 169 and cam 159 moves switch blade 169 into engagement with the adjacent upper fixed contact 176. At the completion of the half turn of the shaft the projection 163 on cam 161 engages switch blade 170 to open switch 172 and thereby de-energize the motor field coil 158 and stop the rotation of shaft 156.

Field coil 158 of the motor remains de-energized and pilot valve 95 remains open until switch 118 is closed. As described above, switch 118 closes when the valve stem 15 of the control valve is raised a predetermined distance sufficient to properly position the cam 19 thereof. Closing of switch 118 completes an energization circuit for the motor field coil 158 through lines 166, 173, 177, switch 118, line 178, fixed contact 176 and switch blade 169. The cam shaft 156 is then driven another half turn to again position the face 157 on cam 155 in engagement with the follower 153 to close auxiliary valve 95. At the completion of the closing of valve 95, the valley 160 on cam 159 will have moved around again into engagement with the cam follower for switch blade 169, and switch blade 169 moves away from upper fixed contact 176. In the meantime, switch 164 will have been reopened, so that with the completion of the second half-turn of cam shaft 156 the energization circuit for the motor field coil 158 is broken and the cam shaft 156 stops. The parts remain in the Fig. 8 position, with the pilot valve 95 closed, until the switch 164 is again closed to initiate another lifting, turning and reseating of valve stem 15.

Attached to the upper end of valve stem 112 (Fig. 3) is a depending, cylindrical, cup-shaped member 119 which extends around an upstanding, generally cylindrical guide member 120 having a lower, annular transverse flange 121 for attaching it to the top of the cam guide member 98. A stationary pointer 122 mounted on the member 120 overlies the lower end of the cup-shaped member 119 mounted on the valve stem and cooperates with suitable indicia on the cup-shaped member 119 to indicate the rotative position of the distributor. Thus, as the cup-shaped member 119 is turned successively in unison with the distributor 14 it presents different indicia at the stationary pointer 122, corresponding to the rotative position of the distributor.

For controlling the flow of water in the service line 42, there is provided an auxiliary valve, indicated generally at 125 in Fig. 1. In the present embodiment this valve includes a valve body 126 located in the service line 42 and having an annular valve seat 127 at the passage through the body. A valve closure disc 128 disposed above the valve seat 127 is carried on a stem 129 attached to a flexible diaphragm 130. The diaphragm 130 is located within a housing formed by a plug 131 closing the top of the body 126 and a top cover 132 having a central bore 133 for slidably receiving the upper end of stem 129. A conduit 134 connected to the fitting 31 in the body of the control valve leads to the upper chamber above the diaphragm 130 for passing thereto fluid from the passage 27 in the body of the control valve whenever the drain valve 76, 77 thereat is closed. The fluid pressure on top of diaphragm 130 moves it downward to seat the valve closure disc 128 on valve seat 127 and stop the flow of water through service line 42. This valve in the service line closes initially just before the rotor 14 of the control valve is unseated and remains closed until after the rotor reseats in it next rotative position. An air relief passage 135 is formed in the plug 131 and communicates with atmosphere for passing air to and from the chamber at the underside of diaphragm 130.

In the above-described construction of the present invention the location of the cam 19 for turning the distributor is of substantial advantage in the operation of the invention. This cam is located away from the central drain passage in the body so as not to in any way obstruct the flow through this drain passage. Therefore, the drain passage in the body, and consequently the entire body, may be smaller in size to obtain a given flow rate through the drain passage than if the cam were located in this drain passage to partially block the flow therethrough. In addition, in the present invention the cam is sealed from contact with any of the reagents which may be used in the fluid treating apparatus such as the acids or alkalis used in de-ionizing apparatus. In the present invention, the cam is preferably sealed from both the untreated fluid and the effluent passing toward the treatment tank.

It will be noted that in the present invention the valve stem 15 has a bearing provided by cam 19 at its extreme upper end and also a bearing at its lower end below the distributor provided by the fingers 76 of the drain valve. In all positions of the valve stem 15 it is guided by these spaced bearings, thereby preventing tilting or other misalignment of the distributor, diaphragm or other parts at any time.

*Operation*

In the operation of this fluid control apparatus for controlling a fluid treatment apparatus, such as water softener or a water deionizing apparatus, for purposes of description let it be assumed that the distributor 14 of the control valve is seated in its service position. The pilot valve 95 is in its normally closed position and water from the pressure supply pipe 93 passes through conduit 92 into the pressure chamber 90 to exert a downward force on the diaphragm 16. The valve stem 15 is in its lowermost position, as shown in Fig. 1, and the drain valve 77 at the drain passage 20 in the body is open. The distributor passage 67 registers with the passage 46 in the face of the body, the passage port 66 at one end of passage 64 registers with body passage 49 and the distributor passage 65 at the opposite end of this distributor passage registers with body passage 50, the solid peripheral protruding portion 142 of the distributor overlies the passage 54, and the solid peripheral protruding portions 140 and 141 of the distributor overlie the passages 53 and 52, respectively. Untreated fluid flowing into the supply chamber 78 through the fitting 81 flows down through the distributor port 67 and through the registering passage 46 at the body face into the chamber 35 in the body, from which it flows through the body passage at 39 to the top of the treatment tank. After passing down through the treatment tank, the fluid passes from the bottom of the treatment tank through the passage at 43 in the bottom wall of the body into the body chamber 38 up through the passage 49 at the body face through the registering distributor passage 66 into the transfer passage 64, and thence through the passage 65 and the registering body passage 50 into the body chamber 37, and from there through the fitting 41 to the service line 42. The auxiliary valve 128 in the service line 42 is maintained open by the water pressure in the service line because the water pressure above diaphragm 130 is exhausted to drain through conduit 134, the passage 27 in the body of the control valve and the opening 26 therefrom leading to the open drain passage 20.

For initiating regeneration the switch 164 is closed to open pilot valve 95. When this occurs, the water pressure in the pressure chamber 90 above diaphragm 16 in the control valve is relieved to drain. Fluid continues to flow through fitting 81 into the supply chamber 78 below diaphragm 16 and the resultant fluid pressure unbalance above and below this diaphragm causes the diaphragm to lift upwardly. The valve stem 15 is raised in unison with diaphragm 16. When stem 15 is raised the drain valve member 77, 76 on its lower end rises to close the drain passage 20. Thereafter, the lower shoulder 75 on valve stem 15 engages the pin 70 and the distributor is unseated. The described arrangement for closing the drain valve before the distributor is unseated serves to prevent the occurrence of water hammer upon unseating of the distributor. When the distributor begins to unseat fluid from the supply chamber 78 passes down through body passage 56 into the passage 27 and, since valve member 77 is closed, from there through conduit 134 to the upper side of diaphragm 130, forcing this diaphragm to close the valve 128 in the service line 42, so as to prevent the flow of fluid to service while the distributor is unseated. Continued upward movement of the stem 15 carries the cam 19 past the stationary cam follower 109, so that the stem and distributor are turned one-eighth of a turn as they rise, as described above. During this continued upward movement of valve stem 15 the drain valve member 77 slides upwardly along the inside of the drain passage member 25 and maintains the drain passage 20 closed. When the stem 15 reaches the limit of its upward movement the shoulder 115 on the stem 112 carried on top of cam 19 closes switch 118 to re-close the pilot valve 95, as described in detail above.

When pilot valve 95 closes fluid pressure builds up in the pressure chamber 90 above the diaphragm 16, moving the diaphragm 16 and the stem 15 downward to reseat the distributor 14 against the face of the body. The resulting downward movement of cam 19 past the cam follower 109 causes the stem 15 and distributor 14 to turn an additional one-eighth of a turn as they move downward, so that when the motor reseats it is displaced one-quarter turn from its service position. The drain valve 77 opens the drain passage 20 in the body after the distributor reseats. Opening of this drain valve releases to drain the fluid pressure above diaphragm 130 permitting the diaphragm valve 128 in the service line to reopen.

With the distributor 14 having been turned and reseated in the backwash position, the flows to and from the water treatment tank during the backwash step of the regeneration cycle are established. In this position of the distributor, the distributor drain passage 63 registers with the body passage 46, the protruding solid segment 144 at the periphery of the distributor overlies the body passage 54, the protruding solid segment 143 at the periphery of the distributor overlies the body passage port 52, and the protruding solid segment 142 at the periphery of the distributor overlies the body passage 53. At this time water passing through the fitting 81 into the supply chamber 78 in the multiport valve passes down through the rotor port 67 and the registering port 48 in the inner face of the body into the body chamber 38 and from there through the fitting 43 to the bottom of the water treatment tank. After backwashing up through the treatment tank the effluent passes from the top of the tank through the fitting 39 into the body chamber 35 and from there up through the port 46 at the ported inner face of passage 62 which leads to the central rotor port 61 emptying into the body.

The preceding operation for unseating, turning, and reseating the rotor of the multiport valve is repeated after sufficient backwash through the treatment tank.

In the next position of the distributor (Fig. 9), (the injection position) one-quarter turn clockwise from the backwash position, the distributor passage 63 at the outer end of distributor drain passage 62 registers with body passage 48, the protruding solid segment 144 at the periphery of the distributor blocks the body passage 53, the protruding solid segment 145 at the periphery of the distributor blocks the body passage 52, and the cut away portion 146 at the periphery of the distributor registers with the body passage 54. For injecting reagent into the treatment tank, fluid flows from chamber 78 down through body passage 54 into the chamber 36 in the body and thence through pipe connection 40 to the ejector 183. The flow of water through the ejector draws brine, from the reagent tank 184 and passes it to the distributor at the top of the treatment tank above the level of the treatment material therein. The reagent then passes down through the treatment material in the treatment tank and the effluent from the bottom of the tank passes into the body chamber 38 and from there up through the body passage 48, through the distributor passage 63 registering therewith and along the distributor passage 62 to the central drain passage 20 in the body.

Following the completion of the reagent injection step, the distributor is unseated, turned an additional quarter turn in the same direction, and reseated to establish the rinse step in the regeneration. In this rotative setting of the distributor (Fig. 10), the cut-away portions 146 and 147 at the periphery of the distributor register respectively with the body pasasges 52 and 53; the distributor passage 65 at one end of the transfer passage 64 registers with the body passage 49 and the passage 66 at the opposite end of the transfer passage registers with the body passage 47, and the protruding solid portion 140 at the periphery of the distributor blocks the body passage 54. At this time, fluid from supply chamber 78 passes down through body passages 52 and 53 into the chamber 55 in the body and from there through pipe connection 39 to the top of the treatment tank for rinsing the same, the effluent from the bottom of the tank passing into the chamber 38 in the body and from there up through body passage 49 and distributor passage 65 into transfer passage 64 and from the port 66 at the other end of this passage down through body passage 47 into the passage 27 in the body. From this passage the effluent passes through the opening 26 (Fig. 7) in the upper drain passage member 25 into the drain passage 20 in the body.

Following the rinse step, the distributor is again unseated, turned, and reseated to its first-described service position.

It is to be understood that each time the distributor is unseated the drain valve is closed just before unseating and is reopened following reseating. This prevents water hammer due to the unseating and reseating of the distributor.

While in the foregoing description and in the accompanying drawings there is disclosed a specific embodiment of the present invention, it is to be understood that various modifications, omissions and refinements departing from the disclosed form of the invention may be resorted to without departing from the spirit and scope of this invention.

We claim:

1. In a water treatment system, the combination of a control valve including a body having a face provided with a plurality of flow passages, means defining a fluid chamber at one side of said face, an inlet conduit communicating with said fluid chamber, a distributor in said chamber mounted in confronting relation with the body face for movement to preselected different rotative positions in confronting relation with the body face to establish different flows through the valve, a service conduit for treated liquid communicating with one of said flow passages, a pressure responsive service valve in said service conduit controlling the flow therethrough, and means including a fluid connection communicating with said control valve and extending between said control valve and said pressure responsive valve for supplying fluid pressure from the control valve to said pressure responsive valve to close said pressure responsive valve while the distributor is being moved between said preselected rotative positions.

2. The combination of claim 1, further characterized by the provision of means to relieve the fluid pressure on said service valve to permit the same valve to open when the distributor of the control valve is positioned at one of its rotative positions, at least.

3. In a water treatment system, the combination of a lift turn valve including a body having a face presenting a plurality of flow passages and a plurality of separate chambers communicating respectively with said passages, housing means defining a fluid supply chamber at one side of said face of the body, an untreated water inlet leading into said fluid chamber, a distributor in said fluid chamber having flow passages and mounted to be seated in confronting relation with the face of the body and to be unseated away from confronting relation with said face, turned to a different rotative position, and reseated in confronting relation with said face for establishing different flows from said fluid chamber through the body, a service water outlet conduit connected to receive water after it flows through the lift turn valve, a pressure responsive service valve in said service conduit for controlling the flow therethrough, and a conduit extending between one of said body chambers and said service valve for supplying fluid from said fluid chamber of the lift turn valve through said body chamber to the service valve to close the service valve when the distributor of the lift turn valve is unseated.

4. A flow control valve comprising in combination a body having a face presenting a plurality of flow passages, one of said passages being a low pressure passage, means defining a fluid supply chamber at one side of said face, a distributor in said chamber having a plurality of flow passages and cooperable with the face of the body to effect different flows through the body in different rotative positions of the distributor, an auxiliary valve in the body for controlling flow through the low pressure passage, and a stem associated with the distributor having longitudinal movement with respect thereto and rotatable to turn the distributor between different rotative positions, said stem being connected to said auxiliary valve for closing the auxiliary valve in response to movement of the stem longitudinally in one direction to prevent fluid flow through the low pressure passage prior to turning the distributor and for opening the auxiliary valve upon longitudinal return movement of the stem in the opposite direction after the distributor has been turned to its next rotative position.

5. A lift turn valve comprising, in combination, a body having a face provided with a plurality of flow passages, one of said passages being a low pressure outlet passage, means defining a fluid supply chamber at one side of said face, a distributor in said chamber having a plurality of flow passages mounted in confronting relation with said face of the body and adapted to be moved away from said face, turned to a different rotative setting, and reseated in confronting relation with said face for establishing different flows through the valve, an auxiliary valve at the low pressure passage controlling flow therethrough, and a stem connected to the distributor and having longitudinal lost-motion movement with respect thereto for unseating the distributor upon movement of the stem longitudinally in one direction and rotatable to turn the distributor after unseating the same, said stem being movable longitudinally in the opposite direction for reseating the distributor after turning the same, said stem being connected to said auxiliary valve to close the auxiliary valve upon initial lost-motion movement of the stem longitudinally in said one direction before unseating of the distributor and to reopen said auxiliary valve upon lost-motion movement of the stem in said opposite direction after the distributor is reseated.

6. A flow control valve comprising, in combination, a body having a face provided with a plurality of flow passages, means defining a fluid supply chamber at one side of said face, a distributor in said chamber having flow passages and cooperable with the face of the body to effect different flows through the valve in different rotative positions of the distributor, movable pressure responsive means, a connection member movable with said pressure responsive means and connected to the distributor to turn the distributor between its rotative positions in response to movement of said pressure responsive means under the influence of fluid pressure thereagainst, and cam means attached to said connection member and sealed from fluid communication with said chamber for turning said connection member and the distributor in response to movement of said pressure responsive means.

7. A flow control valve comprising, in combination, a body having a face provided with a plurality of flow passages, one of said passages being a drain passage, means defining a fluid supply chamber at one side of said face, a distributor in said chamber mounted to be in confronting relation with said face having flow passages to effect different flows through the valve in different rotative settings of the distributor, movable pressure responsive means, a connection member movable with said pressure responsive means and connected to the distributor to turn the distributor between its rotative settings in response to movement of said pressure responsive means, and means connected to said connection member and sealed from fluid communication with said drain passage for turning said connection member and the distributor in response to movement of said pressure responsive means.

8. A flow control valve comprising, in combination, a body having a face provided with a plurality of flow passages, one of said passages being a drain passage, means defining a fluid supply chamber at one side of said face, a distributor in said chamber cooperable with the face of the body to effect different flows through the valve in different rotative positions of the distributor, movable pressure responsive means, a connection member movable with said pressure responsive means and connected to the distributor to turn the distributor between its rotative positions in response to movement of said pressure responsive means under the influence of fluid pressure thereagainst, and cam means connected to said connection member and positioned outside said chamber and in spaced relation from said drain passage for turning said connection member and the distributor in response to movement of said pressure responsive means.

9. A lift turns valve comprising, in combination, a body having a face provided with a plurality of flow passages, means defining a fluid supply chamber at one side of said face, a distributor in said chamber cooperable with the face of the body having flow passages to effect different flows through the valve in different rotative positions of the distributor, movable pressure responsive means, a connection member movable with said pressure responsive means and connected to the distributor to turn the distributor between its rotative positions in response to movement of said pressure responsive means under the influence of fluid pressure thereagainst, fluid pressure means for applying fluid pressure against said pressure responsive means, and means connected to said connection member and sealed in fluid tight relation from said chamber and from said fluid pressure means for turning said connection member and the distributor in response to movement of said pressure responsive means.

10. A flow control valve comprising, in combination, a body having a face provided with a plurality of flow passages, one of said passages being a drain passage located centrally at said face, means defining a fluid supply chamber at one side of said face, a distributor in said supply chamber cooperable with the face of the body having flow passages to effect different flows through the valve in different rotative positions of the distributor, movable pressure responsive means extending across said supply chamber remote from said face of the body and exposed on one side to the fluid pressure in said supply chamber, a stem attached to said pressure responsive means to move therewith, extending therethrough and having a connection to the distributor for turning the distributor between its rotative positions, means defining a pressure chamber at the opposite side of said pressure responsive means for the application of fluid pressure at the opposite side of said pressure responsive means, and cam means connected to said stem and located at said opposite side of said pressure responsive means and sealed from both said chambers for turning said stem and the distributor responsive to movement of said pressure responsive means.

11. In combination, a lift turn valve comprising a body having a face provided with a plurality of flow passages, means defining a fluid supply chamber at one side of said face, a distributor in said chamber mounted to be seated in confronting relation with said face having flow passages for effecting different flows through the lift turn valve in different rotative positions of the distributor, said distributor being mounted to be moved axially away from said face to be unseated therefrom, turned to a different rotative position, and moved axially toward said face to be reseated in confronting relation therewith for establishing different flows through the lift turn valve, movable pressure responsive means, means defining a pressure chamber at said pressure responsive means for the application of fluid pressure thereagainst, and a connection member interconnecting said distributor and said pressure responsive means for moving the distributor axially toward and away from said face and for turning the distributor in response to movement of said pressure responsive means under the influence of fluid pressure in said pressure chamber, an auxiliary valve controlling the fluid pressure condition in said pressure chamber, means for operating said auxiliary valve to establish a first fluid pressure condition in said pressure chamber for effecting movement of said pressure responsive means to move the distributor axially away from said face, and means actuated in response to movement of the distributor for operating said auxiliary valve to establish another fluid pressure condition in said pressure chamber for effecting movement of said pressure responsive means to move the distributor axially toward said face for reseating the distributor in confronting relation therewith.

12. A flow control valve comprising a body having a face provided with a plurality of flow passages, means defining a fluid supply chamber at one side of said face of the body, a distributor mounted in said fluid supply chamber in confronting relation with said face, means for turning said distributor about an axis of rotation between preselected rotative settings, said distributor being formed with peripheral portions in confronting relation with said face having different spacings from said axis of rotation of the distributor, and said passages in the face of the body including passages positioned to be blocked by the distributor from communication with said fluid supply chamber in preselected rotative settings of the distributor and to be located beyond the periphery of the distributor to communicate with said fluid supply chamber in other rotative settings of the distributor.

13. A flow control valve comprising a body having a face provided with a plurality of flow passages, means defining a fluid supply chamber at one side of said face, a distributor in said fluid supply chamber having flow passages and mounted in confronting relation with said face and mounted to be turned about an axis of rotation of the distributor between different rotative settings for establishing different flows through the valve, said distributor at its periphery having spaced outwardly protruding solid segments in confronting relation with said face of the body and with cut-away peripheral portions, said passages in the face of the body including a plurality of spaced passages located equidistant from the axis of rotation of the distributor, said solid protruding peripheral segments of the distributor in certain rotative settings of the distributor being in confronting relation with certain of said last-mentioned passages in said face to block the same from communication with said fluid supply chamber and said cut-away peripheral portions of the distributor in other rotative settings of the distributor registering with said certain passages and exposing the same to communication with said fluid supply chamber.

14. A valve comprising a body having a face provided with a plurality of flow passages, one of said passages being a central drain passage, means defining a fluid supply chamber at one side of said face of the body, a distributor in said chamber mounted in confronting relation with said face for movement to preselected different rotative positions to establish different flows through the valve, a stem having a connection to the distributor for turning the distributor and extending on opposite sides of the distributor, a drain valve connected to the stem on one side of the distributor and positioned to be snugly received in said drain passage to form a bearing for said one end of the stem when the stem is moved to turn the distributor, a cam connected to the opposite end of the stem, a cam guide bushing having a passage for snugly receiving the cam to guide said opposite end of the stem when the stem is moved to turn the distributor, and means coacting with said cam to turn the stem and distributor in response to longitudinal movement of the stem with respect to said face of the body.

15. In a water treating system, the combination of a control valve including a body having a face provided with a plurality of flow passages, means defining a fluid chamber at one side of said face, an inlet line communicating with said flow chamber a distributor in said chamber mounted in confronting relation with the body face for movement to preselected different rotative positions in confronting relation with the body face to establish different flows through the valve, a service conduit for treated liquid communicating with one of said flow passages, a service valve in said service conduit controlling the flow therethrough, and means communicating with said control valve and responsive to pressure in said control valve for operating said service valve to close the latter when the distributor is being moved between said preselected rotative positions.

16. A flow control valve comprising in combination, a body having a face presenting a plurality of flow passages, one of said passages being a low pressure passage, means defining a fluid supply chamber at one side of said face, a distributor in said chamber having a plurality of flow passages and cooperable with the face of the body to effect different flows through the body in different rotative positions of the distributor, an auxiliary valve in the body for controlling flow through the low pressure passage, a stem associated with the distributor having longitudinal movement with respect thereto and rotatable to turn the distributor between different rotative positions, said stem being connected to the auxiliary valve for closing the auxiliary valve in response to movement of the stem longitudinally in one direction and for opening the auxiliary valve in response to movement of the stem in the opposite direction after the rotor has been turned and seated in its next rotative position, a service outlet conduit communicating with one of said passages in said face, a pressure responsive valve in said service conduit controlling the flow therethrough, and means responsive to pressure in said flow control valve for operating said pressure responsive valve to close the latter when the distributor is being moved between rotative positions.

17. A flow control valve comprising in combination, a body having a face presenting a plurality of flow passages, one of said passages being a low pressure passage, means defining a fluid supply chamber at one side of said face, a distributor in said chamber having a plurality of flow passages and cooperable with the face of the body to effect different flows through the body in different rotative positions of the distributor, an auxiliary valve in the body for controlling flow through the low pressure passage, a stem associated with the distributor having longitudinal movement with respect thereto and rotatable to turn the distributor between different rotative positions, said stem being connected to the auxiliary valve for closing the auxiliary valve in response to movement of the stem longitudinally in one direction and for opening the auxiliary valve in response to movement of the stem in the opposite direction after the rotor has been turned and seated in its next rotative position, a service outlet conduit communicating with one of said passages in said face, a pressure responsive valve in said service conduit controlling the flow therethrough, and means connecting said pressure responsive valve to said low pressure conduit in said body for operating said pressure responsive valve to its closed position in response to the pressure rise in said low pressure conduit produced by closing said auxiliary valve and to open the pressure responsive valve when the auxiliary valve is opened.

18. In a water treatment system, a lift turn valve including a body having a face presenting a plurality of flow passages, a service conduit communicating with one of said passages, housing means defining a fluid supply chamber at one side of said face of the body, an untreated water inlet leading into said fluid chamber, a distributor in said fluid chamber having flow passages therein and mounted to be lifted, turned, and reseated in different rotative settings on said face to establish different flows from the fluid chamber through said body, said distributor being constructed to block flow through said one of said passages communicating with the service conduit in all but one of the rotative settings of the valve, a pressure operated valve in the service conduit for controlling the flow therethrough, and means for applying fluid pressure from the control valve to the pressure responsive valve to close said pressure responsive valve while the distributor is being moved between preselected rotative positions.

19. In combination, a flow control valve comprising a body having a face provided with flow passages, a distributor cooperable with said face and mounted to be lifted, turned and reseated on the face in different rotative positions to control the flows through the body, means including a valve stem connected to said distributor operative in response to reciprocation of said stem to lift, turn and reseat said distributor on the body, means for reciprocating said stem, said last mentioned means including a pressure responsive means connected to said stem for moving said stem in response to the fluid pressure acting thereon, an auxiliary valve controlling the application of fluid pressure on said pressure responsive means operative in one position thereof to effect lifting of said stem and operative in the other position thereof to effect lowering of said stem and reseating of said distributor, means for operating said auxiliary valve to said one position to raise said stem, and means responsive to raising of said distributor to a preselected elevated position for operating said auxiliary valve to said other position and thereby effect lowering of said stem.

20. A lift-turn valve comprising, a body having a face provided with ports and passages communicating with said ports, a valve casing attached to the body and defining a fluid chamber at one side of said face, a diaphragm disposed in said chamber and having the periphery thereof secured to said casing, a stem rotatably mounted in said diaphragm for rotation relative thereto, means operatively connecting said stem and diaphragm for effecting axial movement of the stem in response to movement of said diaphragm, a distributor connected to said stem and having ports and passages therein cooperable with said face on said body for establishing different flows therethrough in different rotative settings of said distributor, means connected to said stem for turning the distributor between successive rotative settings in response to axial movement of said stem, and means for controlling the application of fluid pressure on said diaphragm to effect movement of the latter.

References Cited in the file of this patent

UNITED STATES PATENTS

| | | |
|---|---|---|
| 545,083 | Locke | Aug. 27, 1895 |
| 589,124 | Evertsen | Aug. 31, 1897 |
| 623,873 | Borden | Apr. 23, 1899 |
| 971,934 | Siegrist | Oct. 4, 1910 |
| 1,722,603 | Turner | July 30, 1929 |
| 1,840,961 | Kuenzler | Jan. 12, 1932 |
| 2,030,092 | Benson | Feb. 11, 1936 |
| 2,047,131 | Riche | July 7, 1936 |
| 2,051,155 | Staegemann | Aug. 18, 1936 |
| 2,328,323 | Bowers | Aug. 31, 1943 |
| 2,435,366 | Riche | Feb. 3, 1948 |
| 2,573,369 | Snoddy | Oct. 30, 1951 |
| 2,611,392 | Johnson | Sept. 23, 1952 |
| 2,679,376 | Steiner | May 25, 1954 |
| 2,738,807 | Addison | Mar. 20, 1956 |

FOREIGN PATENTS

| | | |
|---|---|---|
| 76,346 | Norway | of 1950 |